(12) United States Patent
Sumi et al.

(10) Patent No.: US 9,088,014 B2
(45) Date of Patent: Jul. 21, 2015

(54) METHOD OF MANUFACTURING SECONDARY BATTERY

(71) Applicants: Tomohide Sumi, Aichi-ken (JP); Takumi Mio, Kariya (JP)

(72) Inventors: Tomohide Sumi, Aichi-ken (JP); Takumi Mio, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 239 days.

(21) Appl. No.: 13/753,572

(22) Filed: Jan. 30, 2013

(65) Prior Publication Data

US 2013/0193371 A1    Aug. 1, 2013

(30) Foreign Application Priority Data

Jan. 31, 2012  (JP) ................. 2012-018072

(51) Int. Cl.
*H01M 4/04* (2006.01)
*H01M 4/139* (2010.01)

(52) U.S. Cl.
CPC ............... *H01M 4/04* (2013.01); *H01M 4/139* (2013.01)

(58) Field of Classification Search
CPC ....................................................... H10M 4/04
USPC ...................................................... 252/182.1
See application file for complete search history.

(56) References Cited

U.S. PATENT DOCUMENTS

| | | | |
|---|---|---|---|
| 5,236,630 A * | 8/1993 | Arima et al. | 252/512 |
| 7,434,981 B2 * | 10/2008 | Amasaki et al. | 366/145 |
| 7,560,050 B2 * | 7/2009 | Satou et al. | 252/512 |
| 2005/0221182 A1 | 10/2005 | Fujiwara et al. | |
| 2007/0007700 A1 * | 1/2007 | Satou et al. | 264/650 |
| 2007/0034841 A1 * | 2/2007 | Satou et al. | 252/512 |
| 2013/0193371 A1 * | 8/2013 | Sumi et al. | 252/182.1 |

FOREIGN PATENT DOCUMENTS

| | | | | |
|---|---|---|---|---|
| JP | 2004-303572 | | 10/2004 | |
| JP | 2005-285606 | | 10/2005 | |
| JP | 2005285606 A | * | 10/2005 | ............. H01M 4/58 |
| JP | 2011-14262 | | 1/2011 | |
| JP | 2013-105638 | | 5/2013 | |

OTHER PUBLICATIONS

Weber et al. Green Conscious Ceramic injection molding, Germany 2012.*

* cited by examiner

*Primary Examiner* — Nicole M Buie-Hatcher
*Assistant Examiner* — M. Reza Asdjodi
(74) *Attorney, Agent, or Firm* — Finnegan, Henderson, Farabow, Garrett & Dunner, LLP (57) ABSTRACT

A method of manufacturing a secondary battery, using an electrode plate having an electrode mixture layer formed from an electrode mixture paste, includes performing wet preliminary kneading to knead a powder and a solvent with a stirrer, while measuring kneading torque, determining a mixing ratio of the powder to the solvent used in the wet preliminary kneading in the case where the kneading torque once increases as kneading time passes from start of kneading, reaches a peak value, and then decreases, as a desirable mixing ratio, and performing main kneading to mix and knead the powder and the solvent of the electrode mixture paste, at the mixing ratio determined as the desirable mixing ratio, at a shearing speed that does not exceed a speed of shearing a mixture of the powder and the solvent with the stirrer during the wet preliminary kneading, and producing the electrode mixture paste.

3 Claims, 5 Drawing Sheets

METHOD OF MANUFACTURING SECONDARY BATTERY

INCORPORATION BY REFERENCE

The disclosure of Japanese Patent Application No. 2012-018072 filed on Jan. 31, 2012 including the specification, drawings and abstract is incorporated herein by reference in its entirety.

BACKGROUND OF THE INVENTION

1. Field of the Invention

The invention relates to a method of manufacturing secondary batteries, using electrode plates having active material layers. More specifically, the invention is concerned with a method of appropriately producing electrode mixture paste used for forming the active material layers of the electrode plates, and manufacturing secondary batteries using the electrode mixture paste.

2. Description of Related Art

A secondary battery is generally comprised of positive and negative electrode plates and a separator, which are stacked together and rolled up, to form a cell housed in a case. Each of the electrode plates includes a current-collector foil coated with active material layers. The electrode plate is produced by coating a metal foil that provides the current-collector foil, with paste containing an active material, and drying the coated foil. The paste is generally produced by mixing and kneading the active material in a powder state and a solvent in a liquid state. A technology concerned with production of the paste is described in Japanese Patent Application Publication No. 2005-285606 (JP 2005-285606 A). According to the technology described in JP 2005-285606 A, a liquid reagent is dripped into a powder of electrode active material, and kneading torque is measured. The properties of the electrode active material are evaluated based on the relationship between the amount of the dripping liquid agent, and the kneading torque. Various conditions used when producing the paste are determined based on the properties thus evaluated.

In the meantime, when a powder is mixed and kneaded with a solvent, the following case may occur. Namely, dilatancy may occur in paste while the powder and the solvent are being kneaded, depending on conditions, such as components of the powder and the speed of shearing the paste during kneading. The paste is kneaded with a rotating stirrer. If dilatancy occurs in a portion of the paste, the portion has reduced fluidity or flowability, and is liable to stick to the stirrer. In this case, the remaining portion of the paste is not sufficiently stirred. Therefore, sufficient mixing and kneading may not be accomplished. As a result, paste having adequate properties, in which the powder is favorably dispersed in the solvent, may not be produced. In addition, even if the electrode mixture paste is formed from the paste in which dilatancy occurs, it would be difficult to coat the current-collector foil with the electrode mixture paste, because of excessively high viscosity of the paste.

SUMMARY OF THE INVENTION

The invention provides a method of producing an electrode mixture paste having a high dispersing quality, and manufacturing a secondary battery using the electrode mixture paste.

One aspect of the invention is concerned with a method of manufacturing a secondary battery, using an electrode plate having an electrode mixture layer formed from an electrode mixture paste. The method includes performing wet preliminary kneading to knead a powder having a given composition and a solvent having a given composition with a stirrer, while measuring kneading torque, determining a mixing ratio of the powder to the solvent used in the wet preliminary kneading in the case where the kneading torque once increases as kneading time passes from start of kneading, reaches a peak value, and then decreases, as a desirable mixing ratio, and performing main kneading to mix and knead the powder and the solvent of the electrode mixture paste, at the mixing ratio determined as the desirable mixing ratio, at a shearing speed that does not exceed a speed of shearing a mixture of the powder and the solvent with the stirrer during the wet preliminary kneading, and producing the electrode paste.

According to the method as described above, the main kneading is performed based on the determined, desirable mixing ratio and shearing speed, so that the electrode mixture paste having good properties can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described in detail with reference to the accompanying drawings. In this embodiment, secondary batteries are manufactured according to the following procedure.

1. Determination of Mixing Ratio of Electrode Mixture Paste (which will be simply called "paste")
1-1. Drip-feed Preliminary Kneading
1-2. Wet Preliminary Kneading
↓
2. Production of Paste
↓
3. Downstream Process (Coating, Roll-up, Storage, etc.)

Of the above-indicated steps, "3. Downstream Process" is substantially identical with that of a general method of manufacturing secondary batteries. This embodiment is characterized by "1. Determination of Mixing Ratio of Electrode Mixture Paste" and "2. Production of Paste". In particular, "1. Determination of Mixing Ratio of Electrode Mixture Paste" is the core or main feature of the invention. Thus, "1. Determination of Mixing Ratio of Electrode Mixture Paste" will be initially described.

In this embodiment, the mixing ratio is determined before production of paste. The mixing ratio mentioned herein is a mixing ratio of a powder to a solvent in an electrode mixture. The powder consists principally of a powder of an active material, but includes other materials. While there is a related art or technology for evaluating properties of a powder of a pure electrode active material, the powder used when actually producing paste by kneading is not limited to the electrode active material. The powder may further include additives, such as a thickener, a conductive additive, and a binder. Therefore, the properties of the actual paste may differ from the properties evaluated according to the related art. Thus, the powder mentioned in this embodiment is a mixed powder including powders of additives, such as a thickener and a conductive additive, as well as the active material. The mixture composition of respective powder components in the mixed powder is substantially the same as the mixture composition used in the actual production of paste. Namely, the powder components are identical with those of the powder used in the actual production. The solvent is also the same as a solvent for use in the actual production. Where a mixture of two or more liquids is used as the solvent, the mixture composition is also the same as that of the solvent for use in the actual production.

In this embodiment, the mixing ratio of the powder to the solvent is determined by conducting preliminary kneading. The preliminary kneading is a step of finding the optimum mixing ratio, by kneading the powder and the solvent while changing the mixing ratio thereof. In this embodiment, two steps of preliminary kneading, i.e., "1-1. Drip-feed Preliminary Kneading" and "1-2. Wet Preliminary Kneading", are performed, so as to find the optimum mixing ratio. The mixing ratio may be determined solely by "1-2. Wet Preliminary Kneading", However, if "1-1. Drip-feed Preliminary Kneading" is performed in addition to "1-2. Wet Preliminary Kneading", a more desirable mixing ratio can be found. This point will be described in detail later. Thus, the drip-feed preliminary kneading and the wet preliminary kneading are kneading steps executed prior to main kneading, for determining the mixing ratio of the powder to the solvent and the shearing speed, which do not cause dilatancy to occur in the production of paste. In each of the preliminary kneading steps, an oil absorption measuring machine according to JIS K5101-13-2 is used. For example, an absorption measuring machine 1 constructed as shown in FIG. 1 may be used for preliminary kneading.

Figure 1:
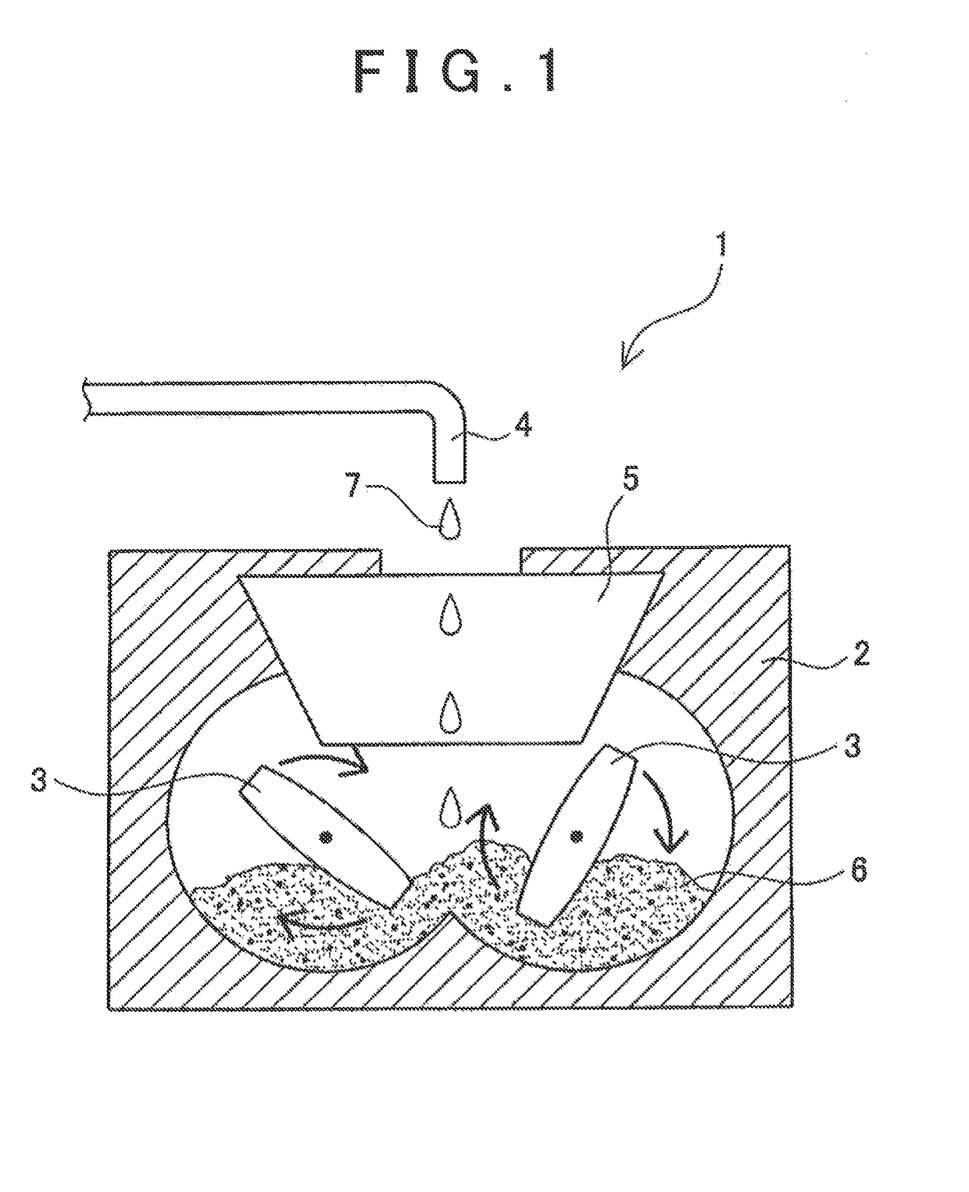
FIG. 1 is a cross-sectional view showing the construction of an oil absorption measuring machine used in one embodiment of the invention.

The absorption measuring machine 1 of FIG. 1 has a stirred vessel 2, stirrers 3, injection nozzle 4, and a funnel 5. The stirred vessel 2 is a vessel used for preliminarily kneading a powder 6 and a solvent 7. The stirrers 3 are provided in the stirred vessel 2. The stirrers 3 are used for stirring the powder 6 and the solvent 7 in the stirred vessel 2 for preliminary kneading. In this embodiment, the stirrer 3 is adapted for measuring torque during stirring (which will be called "kneading torque" in this application). Also, the stirrer 3 is able to control its rotational speed. The injection nozzle 4 is used for supplying the solvent into the stirred vessel 2. In this embodiment, the injection nozzle 4 is adapted to grasp the amount of the solvent supplied to the vessel 2. The funnel 5 is attached to an inlet of the stirred vessel 2, and serves to guide the solvent supplied from the injection nozzle 4, into the stirred vessel 2, without causing leakage.

The "1-1. Drip-feed Preliminary Kneading" using the absorption measuring machine 1 constructed as described above is performed in the following manner. Initially, only the powder 6, out of the powder 6 and the solvent 7, is placed in the stirred vessel 2. Needless to say, the amount of the powder 6 received in the vessel 2 is recorded. Then, the solvent 7 is dripped from the injection nozzle 4 while the stirrers 3 are being driven. In this manner, the amount of the solvent 7 is gradually increased while the amount of the powder 6 in the stirred vessel 2 is made constant. While the speed of rotation of the stirrers 3 is kept constant, variations in the kneading torque with time are recorded.

Figure 2:
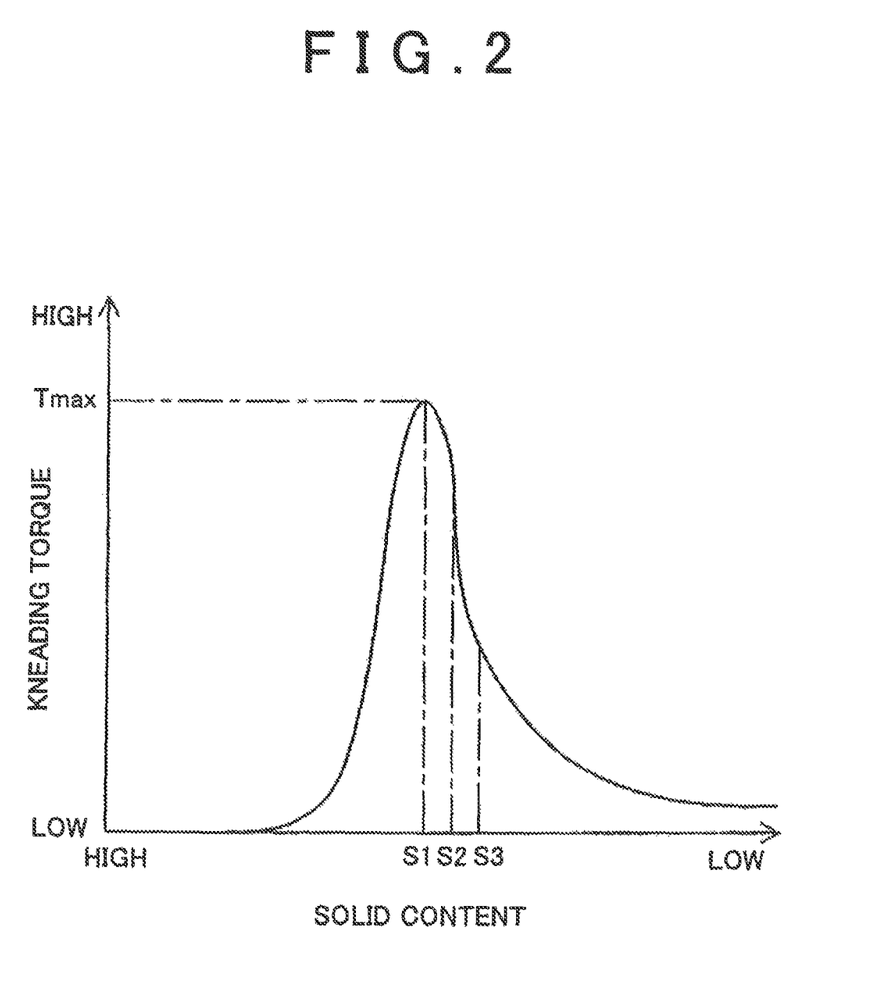
FIG. 2 is a graph showing a typical example of variations in kneading torque of a stirrer when the amount of a solvent is gradually increased while the amount of powder is kept constant.

As a result, a graph as shown in FIG. 2 is generally obtained. In the graph of FIG. 2, the vertical axis indicates kneading torque. The horizontal axis indicates the solid content (%), which is the weight percentage of the powder 6 in the paste. Namely, the accumulated amount of the solvent 7 dripped is larger as the solid content (%) is lower (i.e., as the solid content shifts to the right along the horizontal axis in this graph). As shown in FIG. 2, the kneading torque is small when the solvent 7 starts being dripped, and then the kneading torque increases as the amount of the solvent 7 increases. This may be because the solvent 7 is added to the powder 6 that is initially in a dry state, thereby to form paste as a mixture of the powder 6 and the solvent 7, and the amount of the paste is gradually increased. This may also be because the effect of the thickener included in the powder 6 appears as the amount of the solvent 7 increases. Then, the kneading torque reaches the maximum value Tmax at a certain solid content S1, and then decreases as the amount of the solvent 7 increases. This may be because the paste is brought into a diluted state and the viscosity is reduced, as the amount of the solvent 7 becomes excessively large.

Next, the "1-2. Wet Preliminary Kneading" is started, using the absorption measuring machine 1, in a condition where the powder 6 and the solvent 7 are received in the stirred vessel 2. Namely, no solvent is dripped from the injection nozzle 4, and the powder 6 and the solvent 7 are kneaded in the amounts of a predetermined mixing ratio. If "1-1. Drip-feed Preliminary Kneading" is performed in addition to "1-2. Wet Preliminary Kneading", the mixing ratio of the powder 6 to the solvent 7 used in the wet preliminary kneading may be equal to or lower than the mixing ratio that is obtained in the drip-feed preliminary kneading when the kneading torque reaches a maximum value (the reference mixing ratio). For example, the mixing ratio of the powder 6 to the solvent 7 is determined so that the solid content (%) becomes equal to S1, S2, S3, respectively, in FIG. 2, to provide three samples of paste. The solid content (%) is reduced in the order of S1, S2, S3. As described above, the solid content S1 corresponds to the mixing ratio (the reference mixing ratio) of the powder 6 to the solvent 7 obtained when the kneading torque is at the maximum value Tmax during the drip-feed preliminary kneading. The solid content S2 corresponds to a mixing ratio that indicates a higher proportion of the solvent 7 than that of the solid content S1 (The mixing ratio as a powder to solvent ratio is lower than the reference mixing ratio). The solid content S3 corresponds to a mixing ratio that indicates an even higher proportion of the solvent 7 than that of the solid content S2 (The mixing ratio as a powder to solvent ratio is much lower than the reference mixing ratio), in the wet preliminary kneading, too, the powder 6 and the solvent 7 having a mixing ratio that provides each of the solid contents S1, S2, S3 are kneaded while the speed of rotation of the stirrers 3 is kept constant, and variations in the kneading torque with time are recorded.

Figure 3:
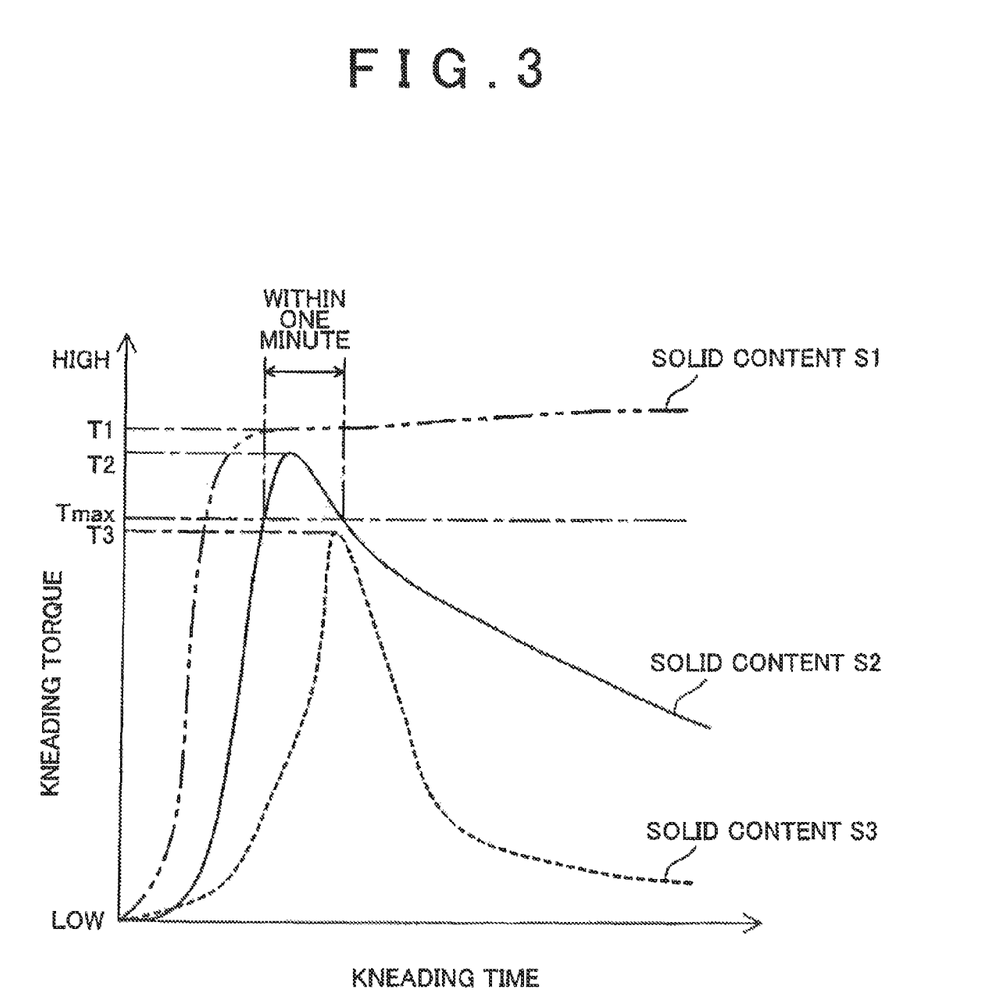
FIG. 3 is a graph showing a typical example of variations in kneading torque of a stirrer when mixtures of powder and solvent having arbitrary mixing ratios are kneaded.

As a result, a graph as shown in FIG. 3 is obtained. In the graph of FIG. 3, the vertical axis indicates kneading torque, and the horizontal axis indicates kneading time. As shown in FIG. 3, when the solid content (%) is S1, the kneading torque increases, after start of wet preliminary kneading, to exceed the maximum value Tmax of kneading torque achieved during drip-feed preliminary kneading, and reach T1, with the passage of the kneading time. Thereafter, the kneading torque is not reduced even if the kneading time increases, and is kept substantially constant at around T1. In the paste for which the kneading torque is kept higher than Tmax, dilatancy is presumed to occur. Namely, the fluidity or flowability of the paste having the solid content S1 is reduced due to the occurrence of dilatancy. Therefore, the powder 6 may not be favorably dispersed in the solvent 7.

Regarding the paste having the solid content S2, the kneading torque increases, after start of kneading, up to a peak T2 that is higher than Tmax and lower than T1, with the passage of the kneading time. Regarding the paste having the solid content S1, the kneading torque increases, after start of kneading, up to a peak T3 that is lower than Tmax, with the passage of the kneading time. When the kneading torque applied to the paste reaches its peak T2, T3, the paste is presumed to be in a condition where the entire volume of the powder 6 is impregnated with the solvent 7. In this embodiment, this condition will be called "completion of wetting". The peak of kneading torque reached upon completion of wetting varies depending on the components used in the powder 6, and the rotational speed of the stirrers 3, for example, but appears within about 2 min. after start of wet preliminary kneading.

When the solid content of the paste is S2 or S3, the kneading torque is reduced after reaching its peak T2, T3 upon completion of wetting, as the kneading time increases. No dilatancy occurs in the paste for which the kneading torque is reduced after completion of wetting. Thus, in the paste having the solid content S2, S3, the powder 6 is favorably dispersed in the solvent 7. Accordingly, the ratio of the powder 6 to the solvent 7, which provides the solid content S2, S3, may be determined as a desirable mixing ratio of the paste, and may be used in the actual production of the paste. Thus, a desirable mixing ratio of the paste can be found, based on variations in the kneading torque during wet preliminary kneading.

Here, the solid contents S2, S3 are lower than the solid content S1 of the paste in which dilatancy occurs. Namely, the occurrence of dilatancy can be curbed or prevented by setting the mixing ratio so that the solid content (%) is lower than that of the paste in which dilatancy occurs.

In the meantime, as shown in FIG. 3, the peak T2 of the kneading torque reached during wet preliminary kneading when the solid content is S2 exceeds the maximum value Tmax achieved during drip-feed preliminary kneading. Also, the length of time for which the kneading torque exceeds Tmax is within one minute. In this case, the powder 6 can be dispersed in the solvent 7 with high efficiency. Namely, the mixing ratio of the powder 6 and the solvent 7, or the solid content (%), may be determined so that the kneading torque applied to the paste during wet preliminary kneading is kept higher than the maximum value Tmax achieved in drip-feed preliminary kneading, only for a length of time equal to or shorter than one minute. With the solid content (%) thus determined, paste having good properties can be produced in a short time. Thus, in the wet preliminary kneading, the optimum mixing ratio of paste, which provides excellent productivity, can be found by using the maximum value Tmax achieved in the drip-feed preliminary kneading, as a reference value.

Accordingly, the following step of "2. Production of Paste" is carried out using the mixing ratio determined as described above. Namely, the ratio of the amount of the powder 6 to the amount of the solvent 7 used in the actual production process is made equal to the mixing ratio that corresponds to the solid content S2 or the solid content S3. The mixing ratio corresponding to the solid content S2 is preferable from the viewpoint of the productivity, since the required kneading time in the main kneading is relatively short, and the powder 6 can be dispersed in the solvent 7 with high efficiency.

The shearing speed during kneading in the actual production process is set to be equal to or lower than the shearing speed used in the wet preliminary kneading. The shearing speed is the speed of shearing paste with each portion of a stirrer, namely, the speed at which each portion of the stirrer moves within the paste when stirring. The shearing speed during kneading is higher at an outer portion of the stirrer as viewed in radial directions of the stirrer. Generally, dilatancy is more likely to take place as the shearing speed is higher. Therefore, if the paste is kneaded in the actual production process at a shearing speed that is higher than the shearing speed in the wet preliminary kneading, dilatancy may occur in the paste. Accordingly, the paste is kneaded in the actual production process so that the speed of shearing the paste with the radially outermost portion of the stirrer in the actual production process does not exceed the speed of shearing the paste with the radially outermost portion of the stirrer in the wet preliminary kneading step. In the present invention, the shearing speed of the stirrer represents the speed of shearing paste with the radially outermost portion of the stirrer.

Then, the actual production process may be performed in a method that has been generally conducted. Since the mixing ratio and the shearing speed appropriately match the characteristics of the materials that are actually used, paste, having good properties can be produced. Consequently, the subsequent "3. Downstream Process" is favorably performed, so that a secondary battery is fabricated.

The mixing ratio determined in the manner as described above is applied to production of past using the same types of powder and solvent as those of the powder and solvent used in the drip-feed preliminary kneading and the wet preliminary kneading, so that favorable kneading can be performed. In the case where the components of the powder and/or solvent are different from those used in the preliminary kneading steps, the mixing ratio is determined by performing preliminary kneading again with respect to the powder and the solvent in this case, so that favorable kneading can be performed. In addition, even if powder and solvent as raw materials are those of the same specifications available from the same manufacturers, it may be considered to determine the mixing ratio again if any of production lots of the raw materials changes.

In the embodiment as described above, a desirable mixing ratio of paste is determined in the wet preliminary kneading while the shearing speed of the stirrers 3 is kept constant, so as to curb or prevent the occurrence of dilatancy. However, the occurrence of dilatancy may also be curbed by reducing the speed of shearing the paste, Namely, even if dilatancy occurs in a paste having a given mixing ratio in a wet preliminary kneading step in which, the rotational speed of the stirrers 3 is set to a given speed, dilatancy may not occur in the same paste in a wet preliminary kneading step in which the rotational speed of the stirrers 3 is set to a suitably lower speed that the given speed. Thus, in this case, paste having good properties can be produced. The kneading torque applied to the paste in this case reaches its peak upon completion of wetting, and is then reduced. By appropriately controlling the speed of rotation of the stirrers 3, the kneading torque applied to the paste during wet preliminary kneading may be varied so that it exceeds the maximum value Tmax achieved in drip-feed preliminary kneading, for a length of time equal to or shorter than one minute. In this case, paste with good properties can be produced in a short time.

Next, working examples of the invention will be described along with comparative example. The methods of the examples and comparative example are applied to production of negative electrodes. In the examples and comparative example, preliminary kneading for determining the mixing ratio and subsequent main kneading are performed under the following conditions. Of these conditions, those with no indication of Example or Comparative Example are conditions common to the examples and comparative example.

[Preliminary Kneading]
Kneading machine: oil absorption measuring machine of FIG. 1
Solvent used: water
Active material as a component of powder: natural graphite with average particle size of 10-15 μm
Thickener: carboxymethyl-cellulose sodium (CMC-Na)
Mixture proportion: 98.99 wt. % of active material+1.01 wt. % of thickener
Sample weight: 30 g
Measurement temperature: room temperature 20° C. (left to nature)
Rotational speed of stirrer: 150 rpm
Solvent dripping speed in drip-feed preliminary kneading: 8 cm³/min.
Solid content (%) of paste used in wet preliminary kneading: 63.5 wt. % (Example 1), 62.0 wt. % (Example 2), 64.5 wt. % (Comparative Example)

Here, leaving the measurement temperature "to nature" means that no special treatment for the purpose of heating or cooling is performed on samples. However, the temperature may vary to some extent due to friction heat caused by stirring, and heat of vaporization of the solvent, for example.

Figure 4:
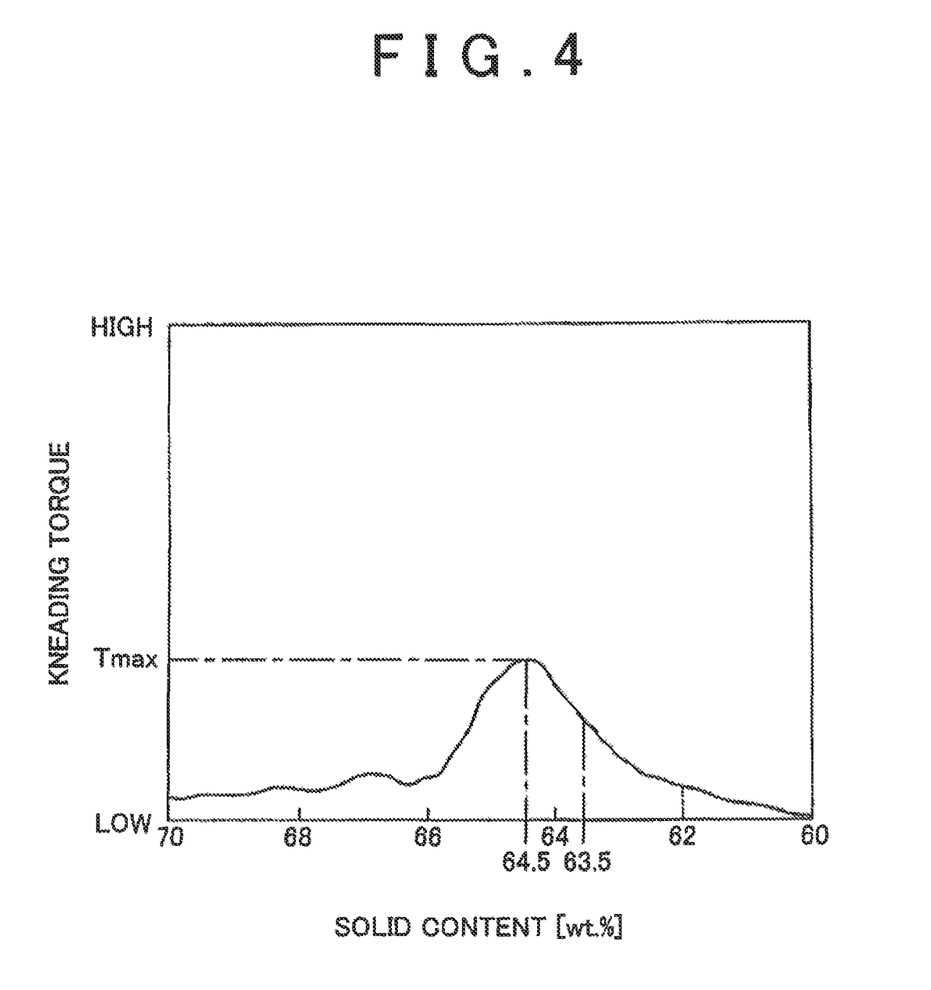
FIG. 4 is a graph indicating measurement results of torque applied to negative electrode samples during drip-feed preliminary kneading.

Initially, drip-feed preliminary kneading was performed under the above-indicated conditions, and results shown in FIG. 4 were obtained. In the graph of FIG. 4, the vertical axis indicates kneading torque, and the horizontal axis indicates the solid content (%). As shown in FIG. 4, the maximum value Tmax of kneading torque is obtained when the solid content is 64.5 wt. %. A sample (paste) having a solid content of 64.5 wt. % is taken as Comparative Example. A sample (paste) having a solid content of 63.5 wt. % is taken as Example 1, and a sample (paste) having a solid content of 62.0 wt. % is taken as Example 2. Namely, the proportion of the solvent in Example 1 is higher than that of Comparative Example, and the proportion of the solvent in Example 2 is even higher than that of Example 1. Any of the solid contents of Examples 1, 2 and Comparative Example is higher than the final solid content (%) which will be described later. Then, wet preliminary kneading was performed on these samples having three different mixing ratios.

Figure 5:
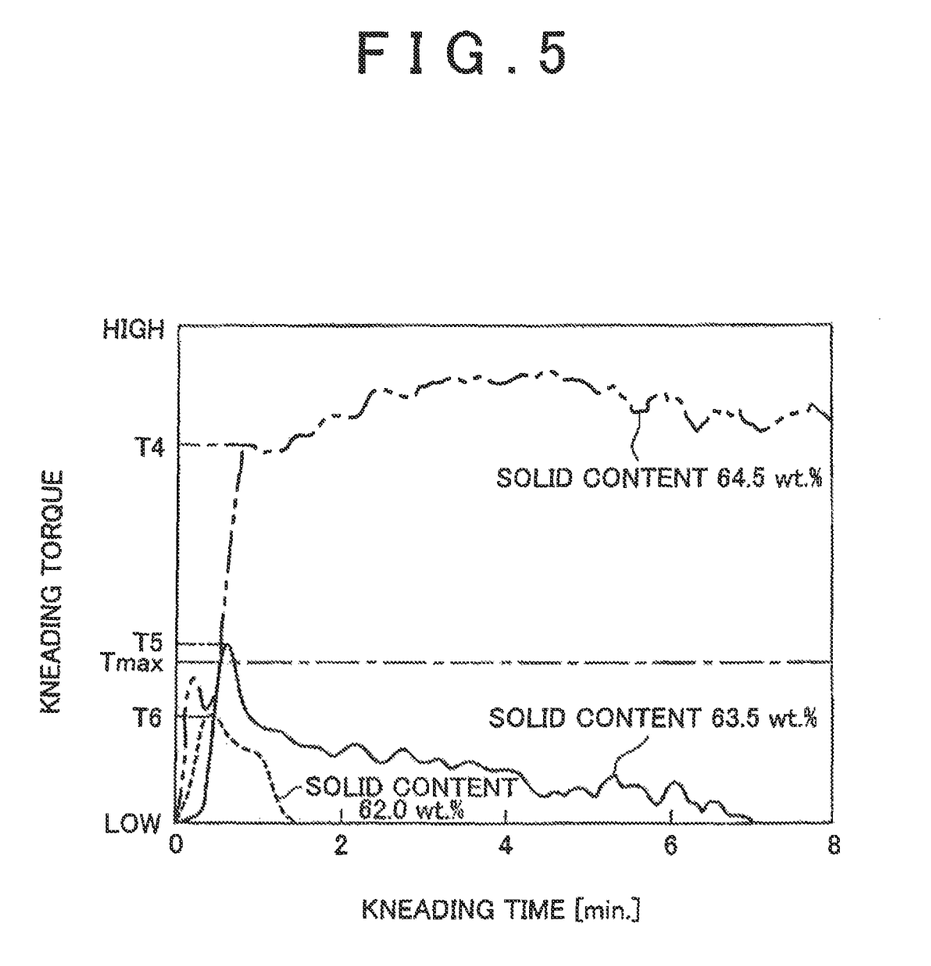
FIG. 5 is a graph indicating measurement results of torque applied to negative electrode samples during wet preliminary kneading.

The graph of FIG. 5 shows results obtained in the wet preliminary kneading step. As shown in FIG. 5, after start of wet preliminary kneading, the kneading torque applied to the paste having a solid content of 64.5 wt. % increases up to T4 with the passage of the kneading time. After reaching T4, the kneading torque is not reduced even if the kneading time increases, and is kept at around T4. Namely, dilatancy is presumed to occur in the paste having the solid content of 64.5 wt. %. This is because the paste having this mixing ratio is taken as Comparative Example.

On the other hand, after start of wet preliminary kneading, the kneading torque applied to the paste having a solid content of 63.5 wt. % reaches a peak T5 at the time of completion of wetting. After start of wet preliminary kneading, the kneading torque applied to the paste having a solid content of 62.0 wt. % reaches a peak T6 at the time of completion of wetting. In both of the pastes having solid contents of 63.5 wt. % and 62.0 wt. %, the kneading torque is reduced after completion of wetting. Thus, no dilatancy occurs in the pastes having the solid contents of 63.5 wt. % and 62.0 wt. %, and the pastes thus produced have good properties. Therefore, the paste having the solid content of 63.5 wt. % is taken as Example 1, and the paste having the solid content of 62.0 wt. % is taken as Example 2.

As shown in FIG. 5, the peak T5 of kneading torque applied to the paste having the solid content of 63.5 wt. % in the wet preliminary kneading step is higher than the maximum value Tmax of kneading torque achieved in the drip-feed preliminary kneading step. Furthermore, the length of time for which the kneading torque applied to the paste during wet preliminary kneading exceeds the maximum value Tmax is within one minute. Accordingly, in Example 1, the paste having good properties can be produced in a short time. Namely, in Example 1, the kneading time required for main kneading can be reduced, as compared with Example 2.

[Main Kneading]
Kneading machine; planetary mixer (1 liter capacity)
Solvent used: water
Active material as a component of powder: the same as that indicated in the above list of conditions for preliminary kneading
Thickener: ditto
Binder; styrene-hutadiene rubber (SBR)
Mixture proportion: 98 wt. % active material+1 wt. % of thickener+1 wt. % of binder
Sample weight: 300 g (the total weight of active material and thickener)
Measurement temperature; room temperature 20° C. (left to nature)
Solid content during rough kneading; 63.5 wt. % (Example 1), 62.0 wt. % (Example 2)
Rotational speed: 50 rpm
Kneading time; 30 min. (Example 1), 90 min, (Example 2)
Diluted-paste kneading speed: 50 rpm
Kneading time: 10 min,
Final solid content; 54 wt. %

In the main kneading, rough kneading was initially perforated with the mixing ratio corresponding to the solid content (%) determined in the preliminary kneading, at the shearing speed that does not exceed the shearing speed in the wet preliminary kneading step. The powder used in the rough kneading consists solely of the active material and the thickener, out of the components of which the mixture proportion is indicated above. Through the rough kneading, high-quality paste in which the powder was uniformly dispersed in water as a solvent was obtained. Then, a small amount of solvent was added to the paste, and diluted-paste kneading was performed. Further, the binder was added to the paste after the diluted-paste kneading, and final kneading was performed. The diluted-paste kneading and final kneading are conducted in order to control the final solid content and properties of the paste in accordance with specifications required from the downstream process. Finally, a negative electrode plate is favorably fabricated from the final paste thus obtained. While the mixture proportion indicated in the above section [Main Kneading] is that of the paste to which the binder has been added, the mixture proportion of the paste consisting solely of the active material and the thickener is the same as the mixture proportion indicated in the above section [Preliminary Kneading].

Then, secondary batteries are produced according to "3. Downstream Process (Coating, Roll-up, Storage, etc.)", using the negative electrode paste obtained in Example 1 or Example 2. Namely, a negative electrode plate is fabricated by applying the negative electrode paste by coating to a negative-electrode current-collector foil, and drying the paste.

While the quality of the paste has a great effect on the process in the coating and drying steps, the paste is of good quality in this embodiment, since the paste having good properties is obtained as described above. On the negative electrode plate, negative-electrode mixture layers are formed. The thus obtained negative electrode plate, a positive electrode plate, and a separator interposed therebetween are stacked together, and rolled up or laid flat to provide an electrode body, and the electrode body is housed in a battery case, so that a secondary battery is produced.

While the invention is applied to the production of the negative electrode plate in this embodiment, the invention may also be applied to production of positive electrode plate. Although the positive electrode plate has components different from those of the negative electrode plate, the structure itself is not significantly different between the positive electrode plate and the negative electrode plate. Therefore, the positive electrode plate and the negative electrode plate are produced by a common method. Thus, the positive electrode plate can be fabricated using paste having good properties, according to the method of the invention.

According to this embodiment, when electrode mixture paste is produced by mixing and kneading a powder and a solvent, the mixing ratio of the powder to the solvent and the shearing speed are initially determined in the wet preliminary kneading step in which the same raw materials as those used in the production of the paste are used, as described above in detail. Then, main kneading is performed on the paste having the determined mixing ratio, at the determined shearing speed, so that paste having good properties is obtained. Therefore, the downstream process is favorably carried out, and high-quality secondary batteries are obtained. In the production of the electrode mixture paste, drip-feed preliminary kneading using the same materials is also performed, so that more desirable mixing ratio and shearing speed are determined through the drip-feed preliminary kneading and wet preliminary kneading. The main kneading is performed on the paste having the mixing ratio thus determined, at the shearing speed thus determined, so that high-quality paste can be produced in a short time. Consequently, secondary batteries can be manufactured with high productivity.

It is to be understood that the illustrated embodiment is merely exemplary, and the invention is by no means limited to this embodiment. Accordingly, the invention may be otherwise embodied with various modifications or improvements, without departing from the principle of the invention. For example, the kneading machine is not limited to the one as indicated above, but may be of another type or model. Also, the active material and other various materials as indicated above are mere examples.

While the binder is added to the paste in the final kneading step in the actual production process in the illustrated embodiment, the invention is not limited to this manner of adding the binder. For example, the binder may be added to the paste during rough kneading. In this case, the powder used in preliminary kneading may contain the binder.

It is to be understood that all points of the illustrated embodiment are merely exemplary, and not limiting. The scope of the invention is not limited to the above description of the embodiment but is defined by the appended claims, and is intended to include all changes or modifications within the scope of the invention defined by the appended claims and equivalents thereof.

What is claimed is:

1. A method of manufacturing a secondary battery, using an electrode plate having an electrode mixture layer formed from an electrode mixture paste, comprising:
    performing wet preliminary kneading to knead a powder having a given composition and a solvent having a given composition with a stirrer, while measuring kneading torque;
    determining a mixing ratio of the powder to the solvent used in the wet preliminary kneading where the kneading torque once increases as kneading time passes from start of kneading, reaches a peak value, and then decreases, as a desirable mixing ratio; and
    performing main kneading to mix and knead the powder and the solvent of the electrode mixture paste, at the mixing ratio determined as the desirable mixing ratio, at a shearing speed that does not exceed a speed of shearing a mixture of the powder and the solvent with the stirrer during the wet preliminary kneading, and producing the electrode mixture paste,
    wherein the method further comprises performing drip-feed preliminary kneading prior to the wet preliminary kneading, by injecting a solvent having a given composition into a powder having a given composition while measuring an amount of the solvent dripped into the powder, and kneading the powder and the injected solvent while measuring kneading torque, and
    wherein determining the mixing ratio of the powder in the wet preliminary kneading comprises determining a mixing ratio of the powder to the solvent used in the wet preliminary kneading where the kneading torque exceeds the maximum value of the kneading torque reached during the drip-feed preliminary kneading, for a length of time that is equal to or shorter than one minute, as the desirable mixing ratio.

2. The method according to claim 1, wherein performing wet preliminary kneading comprises kneading the powder having the same composition as the powder used when producing the electrode mixture paste, and the solvent having the same composition as the solvent used when producing the electrode mixture paste, with the stirrer, while measuring the kneading torque.

3. The method according to claim 1, further comprising:
    determining a mixing ratio of the powder to the solvent used in the drip-feed preliminary kneading when the kneading torque reaches the maximum value thereof, as a reference mixing ratio, wherein
    the wet preliminary kneading is performed at a mixing ratio as a powder to solvent ratio that is equal to or lower than the reference mixing ratio.

* * * * *